United States Patent
Ni et al.

(10) Patent No.: US 7,322,640 B2
(45) Date of Patent: Jan. 29, 2008

(54) HYDROFORMED AND ROLL-FORMED CROSS SILL ASSEMBLY FOR VEHICLES AND METHOD OF MAKING SAME

(75) Inventors: Chi-Mou Ni, Washington, MI (US); Charles J. Bruggemann, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 118 days.

(21) Appl. No.: 10/961,277

(22) Filed: Oct. 8, 2004

(65) Prior Publication Data
US 2006/0076804 A1    Apr. 13, 2006

(51) Int. Cl.
*B62D 21/03* (2006.01)

(52) U.S. Cl. .............. 296/204; 296/184.1; 296/187.08; 296/193.07; 296/205

(58) Field of Classification Search ............. 296/184.1, 296/187.08, 193.07, 204, 205, 209, 29, 30
See application file for complete search history.

(56) References Cited

U.S. PATENT DOCUMENTS

| | | | | |
|---|---|---|---|---|
| 5,992,921 A | * | 11/1999 | Seki ...................... | 296/187.09 |
| 6,206,461 B1 | * | 3/2001 | Gaiser ...................... | 296/204 |
| 6,623,067 B2 | * | 9/2003 | Gabbianelli et al. ........ | 296/205 |
| 6,672,653 B2 | * | 1/2004 | Nishikawa et al. .... | 296/203.04 |
| 6,824,204 B2 | * | 11/2004 | Gabbianelli et al. ........ | 296/205 |
| 6,926,350 B2 | * | 8/2005 | Gabbianelli et al. ... | 296/203.01 |

* cited by examiner

*Primary Examiner*—Dennis H. Pedder
*Assistant Examiner*—Greg Blankenship

(57) ABSTRACT

A hydroformed and roll-formed cross sill assembly for a vehicle and method of making same includes a pair of hydroformed tubular side members. The hydroformed and roll-formed cross sill assembly also includes a roll-formed beam member disposed between the tubular side members and at least one weld to secure the beam member to each of the tubular side members.

2 Claims, 4 Drawing Sheets

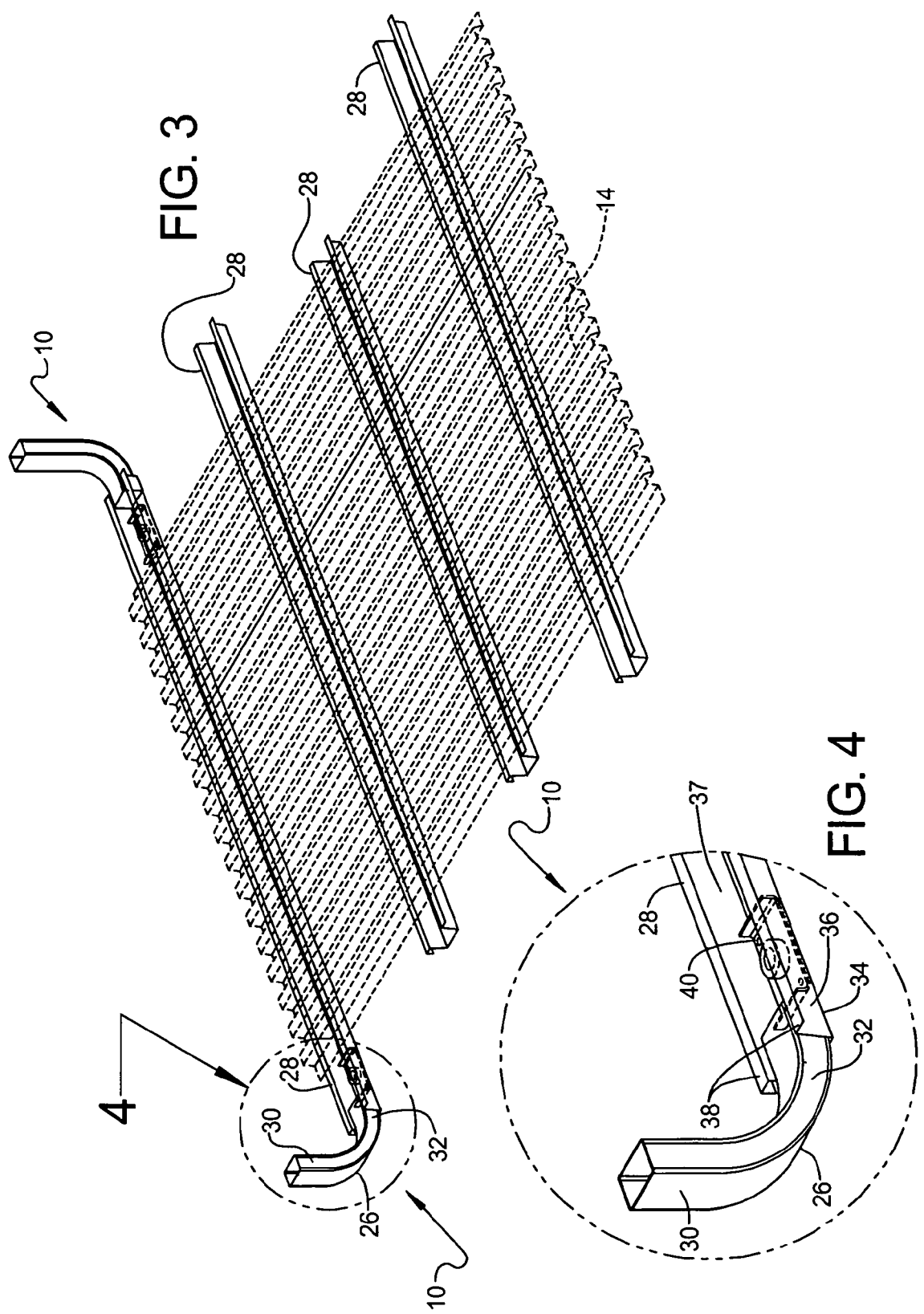

HYDROFORMED AND ROLL-FORMED CROSS SILL ASSEMBLY FOR VEHICLES AND METHOD OF MAKING SAME

TECHNICAL FIELD

The present invention relates generally to hydroformed assemblies and, more particularly, to a hydroformed and roll-formed cross-sill assembly for a vehicle and method of making same.

BACKGROUND OF THE INVENTION

It is known to provide a bed or box for a vehicle such as a pick-up truck. Typically, the bed is generally rectangular in shape to define a cargo area and is closed at the end by a tailgate. Traditional truck beds or boxes for pick-up trucks are constructed with a floor panel, several hat shaped cross sills mounted underneath for support of the floor panel, and inner side panels welded to the floor panel. At the front and rear corners of the bed, vertical reinforcements are welded to the floor panel and side panels to provide lateral stiffness and strength. The welding of the floor panel to bottom edges of the inner side panels involves a structural discontinuity, which in some service conditions, become highly stressed so that it may require additional reinforcement.

It is also known to hydroform tubular components or members. Hydroformed tubular members are becoming increasingly popular in automotive body structural applications. During vehicle body manufacturing, many of the hydroformed tubular members are used in vehicle body and chassis applications. However, vehicle strength, stiffness, and/or impactworthiness often necessitate the need for local areas of structural reinforcement to meet their design goals.

A method to improve the rigidity of the pick-up truck bed or box has been proposed in which two U-shaped hydroformed tubular cross sills are to replace all the hat shaped roll formed parts and all the reinforcements around the stake post areas. With this proposal, it often requires extensive hydroforming tool and equipment investments to hydroform U-shaped tubular sills and significant changes in the existing assembly process sequence.

As a result, it is desirable to provide a new cross sill construction for a bed or box of a vehicle. It is also desirable to provide a new cross sill construction that takes advantage of unique characteristics and cost-effectiveness associated with hydroforming and roll-forming processes. It is further desirable to provide a new method of making a cross-sill construction for a bed or box of a vehicle. Therefore, there is a need in the art to provide a new cross sill assembly and method of making same that meets these desires.

SUMMARY OF THE INVENTION

It is, therefore, one object of the present invention to provide a new cross sill assembly for a vehicle.

It is another object of the present invention to provide a new method of making a cross sill assembly for a vehicle.

To achieve the foregoing objects, the present invention is a hydroformed and roll-formed cross sill assembly for a vehicle including a pair of hydroformed tubular side members and a roll-formed beam member disposed between the tubular side members. The hydroformed and roll-formed cross sill assembly also includes at least one weld to secure the beam member to each of the tubular side members.

Also, the present invention is a method of making a hydroformed and roll-formed cross sill assembly for a vehicle. The method includes the steps of providing a pair of hydroformed tubular side members and providing a roll formed beam member. The method also includes the steps of disposing the beam member between tubular side members. The method further includes the steps of securing the beam member to each of the tubular side members.

One advantage of the present invention is that a hydroformed and roll-formed cross sill assembly is provided for a bed or box of a vehicle such as a pick-up truck to improve rigidity of the bed over traditional stamped designs. Another advantage of the present invention is that a method of making a hydroformed and roll-formed cross sill assembly is provided to improve bed or box performance of a pick-up truck. Yet another advantage of the present invention is that the hydroformed and roll-formed cross sill assembly and method improves part dimensional accuracy with a hydroforming process. Still another advantage of the present invention is that the hydroformed and roll-formed cross sill assembly and method provides flexibility in widths of a bed or box of a pick-up truck. A further advantage of the present invention is that the hydroformed and roll-formed cross sill assembly and method provides a wider range of pay-load capability for a bed or box of a pick-up truck. Yet a further advantage of the present invention is that the hydroformed and roll-formed cross sill assembly and method minimizes tooling and capital investment for manufacturing and equipment.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 3 is a perspective view of another portion of the hydroformed and roll-formed assembly and vehicle of FIG. 1.

FIG. 4 is an enlarged perspective view of a portion of hydroformed and roll-formed cross sill assembly in circle 4 of FIG. 3.

DESCRIPTION OF THE PREFERRED EMBODIMENT

Figure 1:
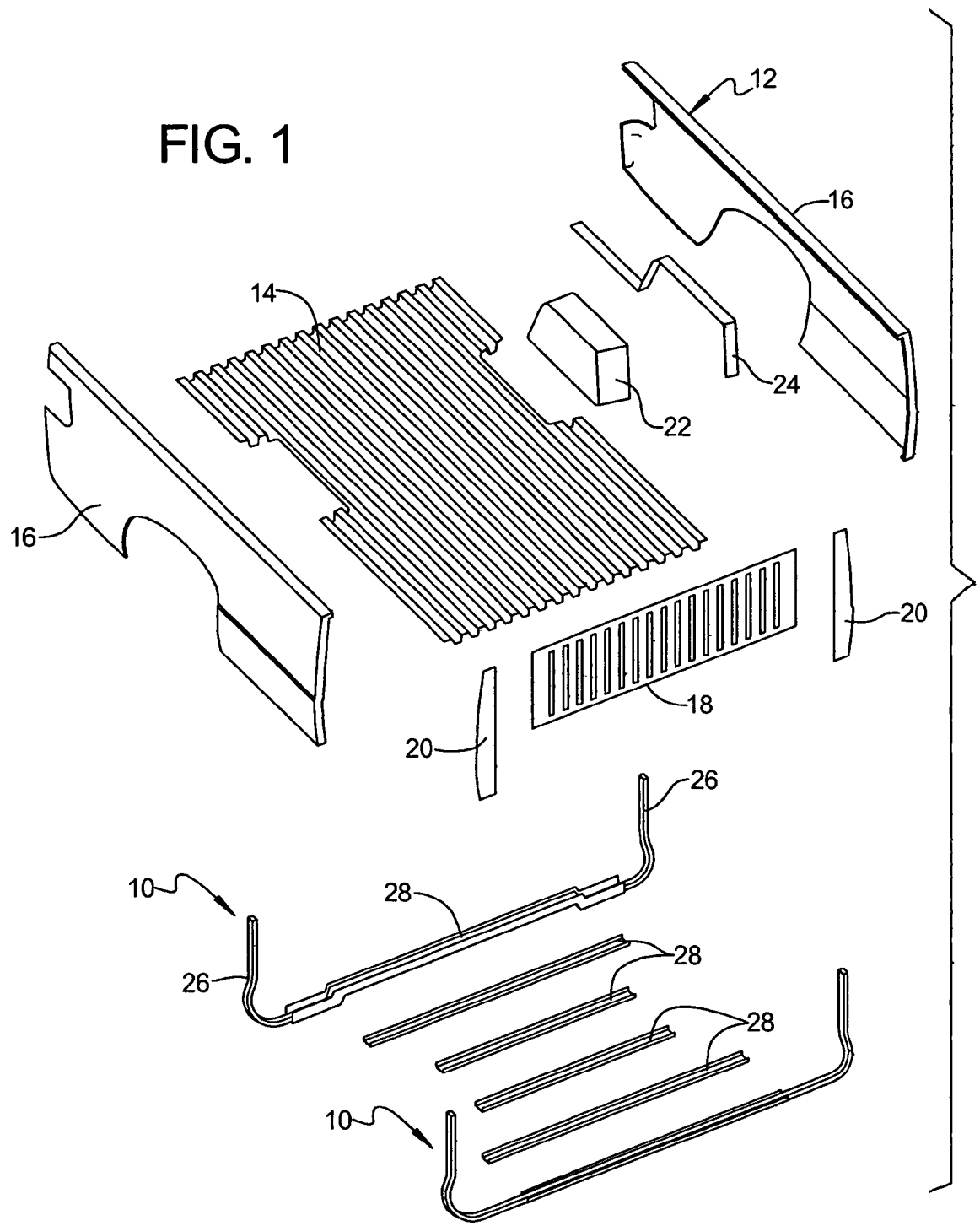
FIG. 1 is an exploded perspective view of a bed or box of a vehicle incorporating a hydroformed and roll-formed cross sill assembly, according to the present invention.

Referring to the drawings and in particular FIG. 1, one embodiment of a hydroformed and roll-formed cross sill assembly 10, according to the present invention, is shown for assembly in automotive structures (not shown) such as a bed or box, generally indicated at 12, for a vehicle such as a pick-up truck. Such pick-up trucks typically include a cab (not shown) forming an occupant compartment and a bed or box, generally indicated at 12, forming a cargo area. The bed 12 is generally rectangular in shape. The bed 12 includes a floor panel 14, two opposed side panels 16, a front panel 18, and a tailgate (not shown) that define the cargo area. The bed 12 also includes at least one, preferably a plurality, more preferably two, of the hydroformed and roll-formed cross sill assemblies 10 to support the floor and side panels 14 and 16, respectively, one at the front and one at the rear of the bed 12. It should be appreciated that the bed 12 may include other panels such as front support panels 20, a wheel well 22, and wheel wall support member 24 (only one shown) for each side thereof. It should also be appreciated that, except for the hydroformed and roll-formed cross-sill assemblies 10, the bed 12 is conventional and known in the art.

Figure 2:
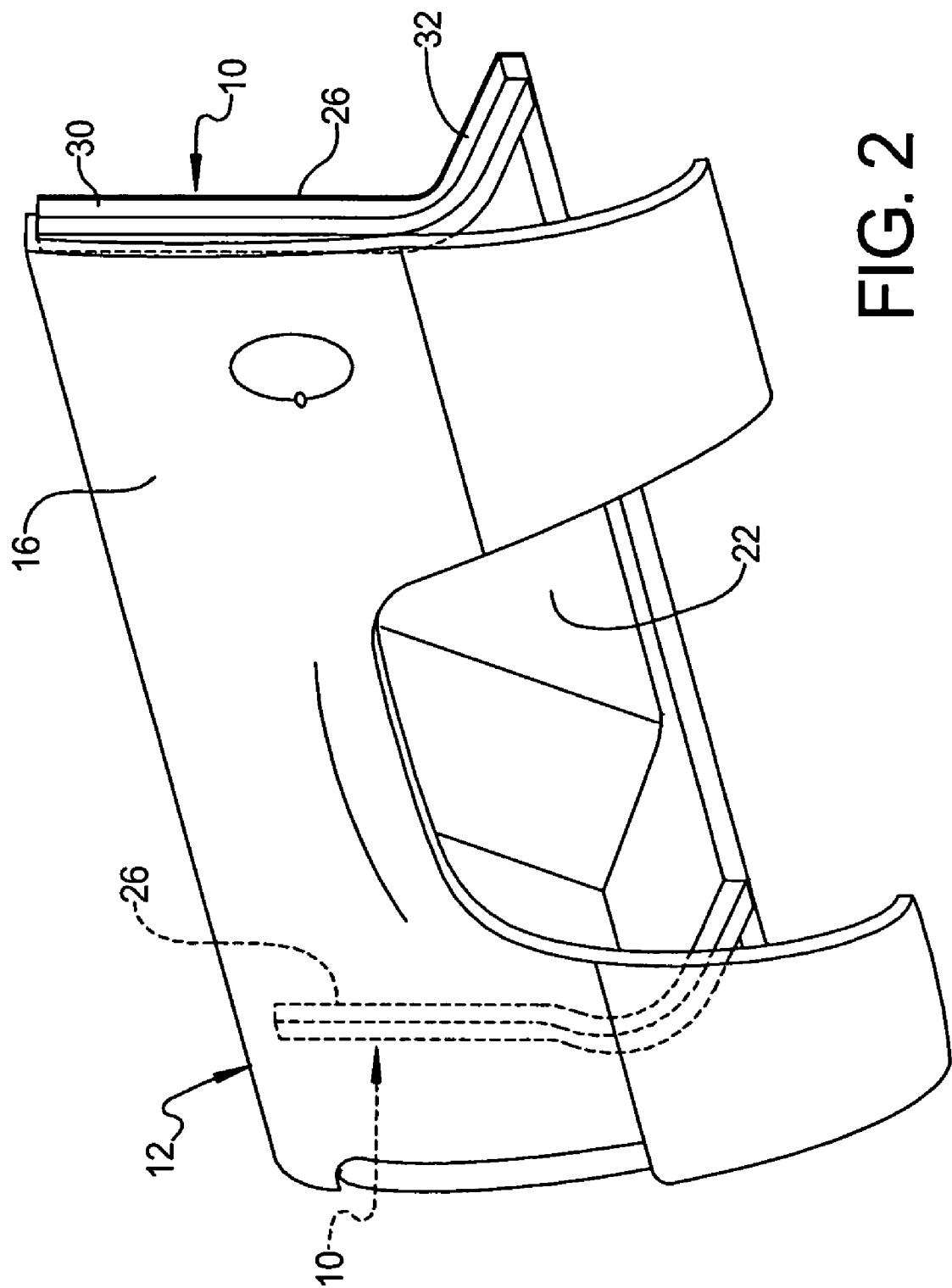
FIG. 2 is a perspective view of a portion of the hydroformed and roll-formed cross-sill assembly and vehicle of FIG. 1.

Referring to FIGS. 2 through 4, each hydroformed and roll-formed cross sill assembly 10 includes at least one, preferably a pair of tubular components or side members 26 and a beam member 28 extending between and attached to each of the side members 26. In one embodiment, the tubular side members 26 are each generally "L" shaped and have a generally rectangular cross-sectional shape. Each side member 26 has a generally vertical arm portion 30 and a generally horizontal leg portion 32. The tubular side members 26 are made of a metal material and formed by a hydroforming process. Each side member 26 is a monolithic structure being integral, unitary, and one-piece.

The beam member 28 extends transversely or axially and has a generally flanged "C" or top hat cross-sectional shape. The beam member 28 has a base wall 24 and a pair of opposed side walls 36 extending generally perpendicular to the base wall 34 to form a channel 37. The beam member 28 also has a flange wall 38 extending generally perpendicular to each of the side walls 36. The beam member 28 is made of a metal material and formed by a conventional roll-forming process. The beam member 28 is a monolithic structure being integral, unitary, and one-piece.

The beam member 28 extends between and is joined to the tubular side members 26. The leg portion 32 of each of the tubular side members 26 is disposed in the channel 37 of the beam member 26. The base wall 34 and side walls 36 of the beam member 28 are joined to opposed sides of the tubular side member 26 to overlap a portion of the tubular side member 26 by a suitable fastening mechanism such as welds. In the embodiment illustrated, the cross sill assembly 10 may include another member such as a bracket 40 disposed against the tubular side member 26 and joined to the beam member 28 by a suitable fastening mechanism such as welds. The cross sill assembly 10 is integral and one-piece.

For assembly of the bed 12, the L-shaped hydroformed tubular side members 26 at both ends of the straight beam member 28 are disposed inside the two side panels 16. The hydroformed tubular side members 26 are welded and joined to the beam member 28. The side members 26 are welded and joined to the side panels 16 and the beam member 28 is disposed underneath and welded to the floor panel 14. It should be appreciated that, by extending the cross sill assemblies 10 around and up along the inner sides of the bed 12, the side panels 16 are more firmly supported by stronger hydroformed tubular side members 26 which are stronger than conventional hat section reinforcements usually provided for the side panels 16 and the floor panel 14 is firmly supported by the hat section beam member 28. It should also be appreciated that the combined three-piece cross sill assembly 10 from side to side could be used for the front and rear sections of the bed 12 of the pick-up truck.

One embodiment of a method, according to the present invention, of making a hydroformed and roll-formed cross sill assembly 10 is disclosed. The method includes the step of providing at least one, preferably a pair of tubular side members 26. The tubular side members 26 are made of a metal material. In one embodiment, the tubular side members 26 are generally "L" shaped and have a generally rectangular cross-sectional shape.

According to one method of hydroforming, the tubular side members 26 are placed in a die set (not shown) comprised of an upper die half and a lower die half. The ends of each tubular side member 26 are sealed and hydraulic fluid is pumped into the tubular side member 26 under pressure. The upper die half and lower die half are progressively closed so that the tubular side member 26 is progressively deformed and the pressurized fluid captured therein expands the walls of the tubular side member 26 into cavity portions of the die halves.

Once the die is closed, the tubular side member 26 is then expanded to a final cross-sectional profile by increasing the hydraulic pressure sufficient to exceed the yield limit of the tubular side member 26 so that the tubular side member 26 is forced into conformity with the cavity portions of the die halves. The die halves are then opened to permit removal of the finished tubular side member 26 from the die halves. It should be appreciated that other methods of hydroforming may involve substitution of pre-forming for the initial pressure stage.

The method also includes the step of providing a beam member 28. The method includes the step of roll-forming the beam member 28. The method includes the step of roll-forming the beam member 28 by a roll-forming process to have a hat shaped cross-section.

The method further includes the step of welding the tubular side members 26 and the beam member 28 together to form the cross sill assembly 10. The welding occurs along an interface between the beam member 28 and the ends of the tubular side members 26. It should be appreciated that the welds may be stitch, spot, laser, and/or continuous.

Figure 5:
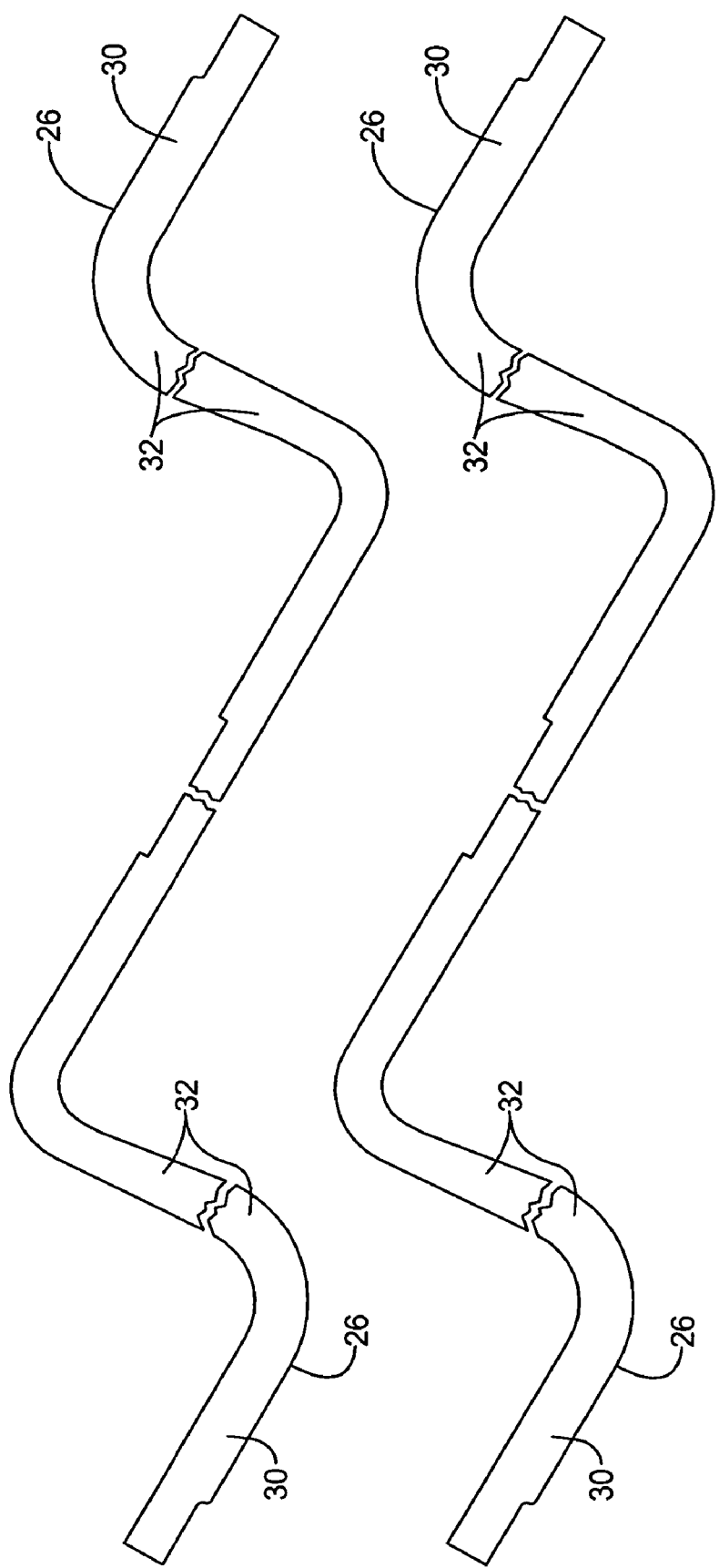
FIG. 5 is a perspective view of a portion of the hydroformed cross sill parts of FIG. 1 illustrating manufacture thereof.

Referring to FIG. 5, the L-shaped hydroformed tubular side members 26 are shown. To optimize the manufacturing effectiveness, all the L-shaped hydroformed tubular side members 26 are nested in such a way so that multiple pieces of the L-shaped tubular side members 26 could be hydroformed from one operation using a single tool with one or multiple die cavities to increase the throughput in manufacturing components and to minimize the required tool and press equipment investments. It should be appreciated that the conventional assembly process could be re-used for assembly of the bed 12 of the pick-up truck to minimize the required new investment.

Accordingly, the method of the present invention takes advantage of the unique characteristics and cost-effectiveness associated with hydroforming and roll-forming, respectively. With the method of the present invention, the L-shaped hydroformed tubular side members 26 provide required additional stiffness and strength to the side panels 16 due to their continuous corner radii and various section sizes and the middle straight roll-formed beam member 28 provides support of the floor panel 14 in a very cost-effective manner in manufacturing and assembly.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A hydroformed and roll-formed cross sill for a vehicle comprising:
a pair of hydroformed tubular side members each having a generally "L" shape and a generally rectangular cross-sectional shape, each of said tubular side members having a generally vertical arm portion and a generally horizontal leg portion;

a roll-formed beam member disposed between said leg portion of each of said tubular side members, said beam member having a base wall, a pair of opposed side walls extending generally perpendicular from said base wall, and a pair of flange walls, one of said flange walls extending generally perpendicular from one of said side walls; and a plurality of welds to directly join said base wall and said side walls to a surface of said leg portion of each of said tubular side members.

2. A method of making a hydroformed and roll-formed cross sill assembly for a vehicle, said method comprising the steps of:

hydroforming a pair of tubular side members each having a generally "L" shape and a generally rectangular cross-sectional shape, each of said tubular side members having a generally vertical arm portion and a generally horizontal leg portion;

roll-forming a beam member with a top hat cross-sectional shape having a base wall, a pair of opposed side walls extending generally perpendicular from the base wall, and a pair of flange walls, one of the flange walls extending generally perpendicular from one of the side walls;

disposing the beam member between the leg portion of each of the tubular side members; and securing the beam member directly to the leg portion of each of the tubular side members by welding the base wall and the side walls to a surface of the leg portion of each of the tubular side members.

* * * * *